United States Patent
Chang et al.

(10) Patent No.: US 9,973,326 B2
(45) Date of Patent: May 15, 2018

(54) METHOD AND APPARATUS FOR TRANSMITTING/RECEIVING SIGNAL IN INBAND FULL DUPLEX SYSTEM

(71) Applicant: Electronics and Telecommunications Research Institute, Daejeon (KR)

(72) Inventors: Kapseok Chang, Daejeon (KR); Seon-Ae Kim, Daejeon (KR); Hyung Sik Ju, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 169 days.

(21) Appl. No.: 14/943,656

(22) Filed: Nov. 17, 2015

(65) Prior Publication Data
US 2016/0149691 A1 May 26, 2016

(30) Foreign Application Priority Data

Nov. 17, 2014 (KR) .................. 10-2014-0160285
Nov. 19, 2014 (KR) .................. 10-2014-0161819
Nov. 17, 2015 (KR) .................. 10-2015-0161160
Nov. 17, 2015 (KR) .................. 10-2015-0161167

(51) Int. Cl.
*H04L 5/14* (2006.01)
(52) U.S. Cl.
CPC .................. *H04L 5/1461* (2013.01)
(58) Field of Classification Search
CPC .................................................. H04L 5/1461
See application file for complete search history.

(56) References Cited

U.S. PATENT DOCUMENTS

| | | | |
|---|---|---|---|
| 5,886,986 A | 3/1999 | Lee et al. | |
| 6,373,352 B1 | 4/2002 | Lee et al. | |
| 8,290,100 B2 * | 10/2012 | Komninakis | H04B 1/10 324/76.23 |
| 2009/0290516 A1 * | 11/2009 | Han | H03G 3/3068 370/277 |
| 2011/0130090 A1 | 6/2011 | Kwak et al. | |
| 2011/0244790 A1 | 10/2011 | Kwak et al. | |
| 2014/0198688 A1 * | 7/2014 | Li | H04B 1/525 370/278 |
| 2015/0171903 A1 * | 6/2015 | Mehlman | H04B 1/10 375/346 |
| 2015/0333847 A1 * | 11/2015 | Bharadia | H04B 15/00 455/63.1 |
| 2015/0341125 A1 * | 11/2015 | Bharadia | H04B 1/00 370/277 |
| 2016/0127112 A1 * | 5/2016 | Shalizi | H04B 1/525 370/278 |
| 2017/0005773 A1 * | 1/2017 | Liu | H04B 1/525 |

FOREIGN PATENT DOCUMENTS

| | | |
|---|---|---|
| KR | 1020110060304 A | 6/2011 |
| KR | 1020110110733 A | 10/2011 |
| KR | 101498286 B1 | 2/2015 |

* cited by examiner

*Primary Examiner* — Luat Phung
(74) *Attorney, Agent, or Firm* — William Park & Associates Ltd.

(57) ABSTRACT

Provided are an apparatus and method for transmitting/receiving a signal. The method for transmitting/receiving a signal includes reducing a quantization error in a baseband (BB) analog area with respect to a reception signal, and performing self-interference cancellation (SIC) on a first output signal output from a BB analog circuit unit in a digital area.

18 Claims, 14 Drawing Sheets

METHOD AND APPARATUS FOR TRANSMITTING/RECEIVING SIGNAL IN INBAND FULL DUPLEX SYSTEM

CROSS-REFERENCE TO RELATED APPLICATION

This application claims priority to and the benefit of Korean Patent Application Nos. 10-2014-0160285, 10-2014-0161819, 10-2015-0161160 and 10-2015-0161167 filed in the Korean Intellectual Property Office on Nov. 17, 2014, Nov. 19, 2014 and Nov. 17, 2015, the entire contents of which are incorporated herein by reference.

BACKGROUND OF THE INVENTION (a) Field of the Invention

The present invention relates to an apparatus and method for transmitting/receiving a signal in inband full duplex system.

(b) Description of the Related Art

An inband full duplex (IFD) scheme is a technique of receiving a signal, while simultaneously transmitting a signal in the same frequency band at the same time, which is able to theoretically double wireless capacity at the maximum, compared with a half duplex (HD) scheme currently employed in wireless communication systems.

FIG. 1 is a conceptual view illustrating an HD system.

Referring to FIG. 1, a node of an HD system transmits and receives a signal at a distributed time or through a distributed frequency, that is, uses a different time or frequency resource in transmitting and receiving a signal, and thus, it is easy to maintain orthogonality of transmitted and received signals. However, in the HD system, if a different time or frequency resource is used for signal transmission and reception, double the resource may be consumed, compared with an inband full duplex (FD) system. In particular, as a solution to inefficiency of the HD system, in an IFD system, a node may simultaneously (that is, the same time resource) transmit and receive in the same band (that is, the same frequency resource). The IFD system may theoretically double link capacity at the maximum, compared with an HD system. The IFD scheme is a technique requisite for attaining a goal of increasing traffic capacity of small wireless devices such as smartphones to 1000 folds as pursued in $5^{th}$-generation (5G) mobile communication.

However, in order to realize such an IFD system, a self-interference signal needs to be canceled. That is, a signal (self-transmission signal) transmitted in a transmission/reception device of an IFD system may be easily introduced to a receiver, and thus, the self-transmission signal may act as strong self-interference on a valid reception signal. A technique for canceling such self-interference is a self-interference cancellation (SIC) technique.

SUMMARY OF THE INVENTION

The present invention has been made in an effort to provide an apparatus having advantages of canceling a self-interference signal through digital and analog signal processing.

The present invention has also been made in an effort to provide a method having advantages of canceling a self-interference signal through digital and analog signal processing.

An exemplary embodiment of the present invention provides an apparatus for transmitting/receiving a signal in inband full duplex system. The apparatus for transmitting/receiving a signal in inband full duplex system may include: a baseband (BB) analog circuit unit configured to reduce a quantization error in a BB analog area with respect to a reception signal; and a BB digital circuit unit configured to perform self-interference cancellation (SIC) on a first output signal output from the BB analog circuit unit in a digital area, wherein the BB digital circuit unit determines a gain control coefficient for controlling the BB analog circuit unit on the basis of a difference in strength level between input and output signals of the BB digital circuit unit.

The BB analog circuit unit may include a variable gain amplifier (VGA), and a gain of the VGA may be controlled by the gain control coefficient.

The apparatus may further include: a radio frequency (RF) analog circuit unit configured to perform SIC in an RF analog area through a finite impulse response (FIR) filter.

The BB analog circuit unit may include a first digital-to-analog converter (DAC) and a second DAC, and the first DAC may convert a transmission signal into an analog signal and delivers the converted analog signal to the RF analog circuit unit, and the second DAC may convert a self-interference (SI) signal output from the BB digital circuit unit into an analog signal and delivers the converted analog signal to the VGA.

The BB analog circuit unit may further include an automatic gain controller (AGC) configured to automatically control a gain of the reception signal; and a switch configured to perform switching between the RF analog circuit unit and the VGA and the AGC, and the BB digital circuit unit may generate a switching control signal for controlling the switch.

The BB digital circuit unit may determine the switching control signal on the basis of a difference between the strength level of the input signal input to the BB digital circuit unit and the strength level of the output signal output from the BB digital circuit unit.

The switch may be switched toward the RF analog circuit unit by the switching control signal when the difference is smaller than a predetermined threshold value, and may be switched toward the VGA by the switching control signal when the difference is greater than the predetermined threshold value.

The BB analog circuit unit may include a digital-to-analog converter (DAC), and the DAC may convert a transmission signal into an analog signal, and delivers the converted analog signal to the VGA and the RF analog circuit unit.

The apparatus may further include: one antenna configured to transmit and receive a signal, wherein the RF analog circuit unit may include a distributor distributing the reception signal and a transmission signal to be transmitted through the antenna.

The apparatus may further include: a transmission antenna for a transmission signal and the reception antenna for a reception signal.

Another exemplary embodiment of the present invention provides a method for transmitting/receiving a signal in inband full duplex system. The method for transmitting/receiving a signal in inband full duplex system may include: reducing a quantization error in a baseband (BB) analog area with respect to a reception signal; and performing self-interference cancellation (SIC) on a first output signal output from a BB analog circuit unit in a digital area, wherein the reducing of the quantization error is performed on the basis of a gain control coefficient determined on the basis of a difference between strength levels of input and output signals of a BB digital circuit unit performing the SIC. The reducing of the quantization error may include performing, by a variable gain amplifier (VGA), variable gain amplification on a self-interference (SI) signal output after the SIC is performed in the digital area, and the variable gain amplification may be controlled by the gain control coefficient.

The method may further include: performing SIC in a radio frequency (RF) analog area through a finite impulse response (FIR) filter.

The reducing of the quantization error may further include: converting a transmission signal into an analog signal and delivering the converted analog signal to the FIR filter; and converting the SI signal into an analog signal and delivering the converted analog signal to the VGA.

The reducing of the quantization error may further include: automatically controlling, by an automatic gain controller (AGC), a gain of the reception signal; and performing switching between a first terminal to which the reception signal is delivered and a second terminal connected to the VGA, and the AGC, and the performing of the SIC may include: generating a switching control signal for controlling a switch.

The method may further include: determining the switching control signal on the basis of a difference between the strength level of the input signal input to the BB digital circuit unit and the strength level of the output signal output from the BB digital circuit unit.

The method may further include: switching the switch to the first terminal by the switching control signal when the difference is smaller than a predetermined threshold value; and switching the switch to the second terminal by the switching control signal when the difference is greater than the predetermined threshold value.

The reducing of the quantization error may further include: converting a transmission signal into an analog signal and delivering the converted analog signal to the VGA and the FIR filter.

The method may further include: distributing the reception signal and a transmission signal to be transmitted through an antenna through which the reception signal has been received. The method may further include: receiving the reception signal by a reception antenna, and transmitting a transmission signal by a transmission antenna.

DETAILED DESCRIPTION OF THE EMBODIMENTS

Figure 1:
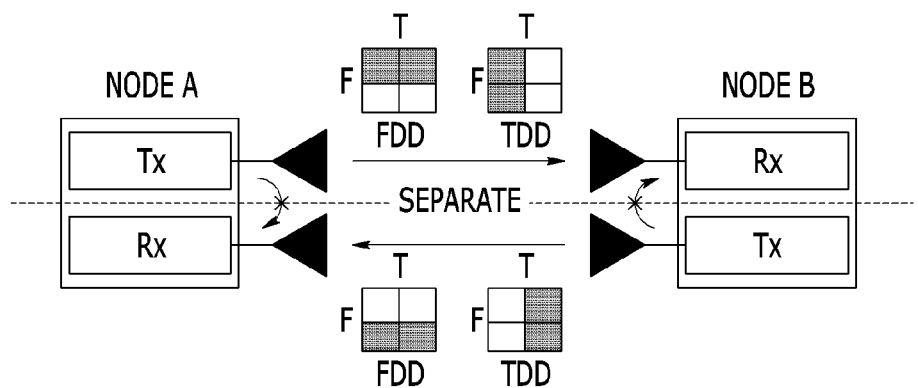
FIG. 1 is a conceptual view illustrating a half duplex (HD) system.

Hereinafter, embodiments will be described in detail with reference to the accompanying drawings such that they can be easily practiced by those skilled in the art to which the present invention pertains. The described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may refer to a mobile station (MS), a mobile terminal (MT), an advanced mobile station (AMS), a high reliability mobile station (HR-MS), a subscriber station (SS), a portable subscriber station (PSS), an access terminal (AT) or a user equipment (UE), and a machine type communication (MTC) device, and may include the entirety or a portion of functions of the MT, MS, AMS, HR-MS, SS, PSS, AT, or UE.

Also, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (BSs) (e.g., a femto base station (BS), a home node B (HNB), a home eNodeB (HeNB), a pico BS, a mecro BS, a micro BS, etc.), and the like, and may include the entirety or a portion of functions of an ABS, a node B, an eNodeB, an AP, an RAS, a BTS, an MMR-BS, an RS, an RN, an ARS, an HR-RS, a small BS, and the like.

Figure 2:
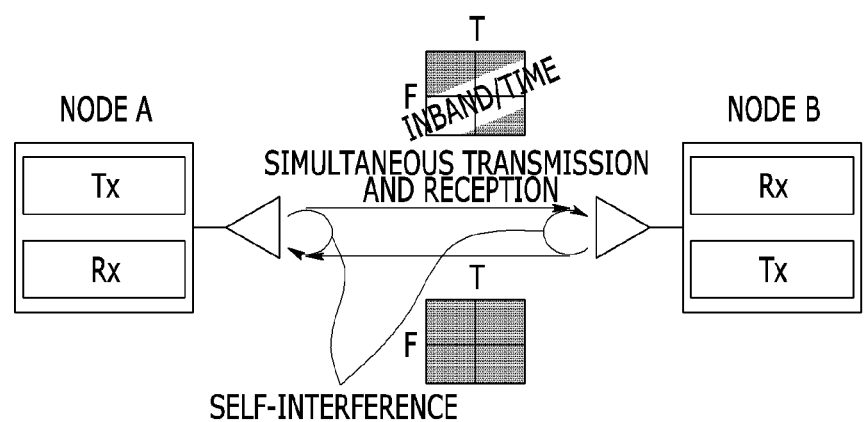
FIG. 2 is a conceptual view illustrating an inband full duplex (IFD) system according to an exemplary embodiment.

FIG. 2 is a conceptual view illustrating an inband full duplex (IFD) system according to an exemplary embodiment.

Referring to FIG. 2, in an IFD system, each node experiences self-interference of a transmission signal with respect to a reception signal, and thus, a self-interference cancellation (SIC) technique is essential.

For example, among SIC techniques is a propagation SIC technique of an antenna area in which a transmission antenna and a reception antenna are physically separated at a considerable interval. In the propagation SIC technique, transmission and reception antennas may be disposed to be separated at a considerable interval, thereby lowering a self-interference level and canceling residual self-interference in a digital area. However, the propagation SIC technique needs to secure a considerable space between the transmission and reception antennas, and thus, it is not easy to apply to small devices. That is, small devices have limiting conditions regarding a space between transmission and reception antennas, requiring a technique of performing SIC without physically separating transmission and reception antennas.

An SIC technique of an analog circuit area may be classified as a passive SIC technique and an active SIC technique. The passive SIC technique, which realizes SIC using a passive element, easily obtains an SIC gain but has a limitation in a size of the gain. In contrast, the active SIC technique may obtain a high SIC gain, compared with the passive SIC technique, by using an adaptive analog finite impulse response (FIR) filter, or the like. However, a related art active SIC technique cannot rapidly adapt to a change in a surrounding environment to maintain a high SIC gain in a wideband. Also, in order to calculate a coefficient of the FIR filter, high cost (the use of a memory, or the like), high complexity, and high power consumption are required. Also, in the active SIC technique, there may be a limitation in digital expression when a received signal is transmitted from a baseband analog area to a digital area, and thus, in the active SIC technique, generally, a range of a reception signal level is controlled to a predetermined level range and quantization is subsequently performed thereon to generate a digital sample signal. Here, in a case in which SIC is not sufficiently performed in an analog circuit area, a signal as a target for automatic control may be a self-interference signal, rather than a desired (reception) signal and a quantization error may occur by a difference between a strength level of the self-interference signal and a strength level of the desired signal. Also, even in a baseband digital area, a non-linear self-interference signal, together with a linear self-interference signal, needs to be canceled. The reason is because, even though the linear self-interference signal is completely canceled in a baseband, if the non-linear self-interference signal is greater than or similar to a signal-to-noise ratio of the desired signal, reception quality of the desired signal may not adjusted due to the non-linear component.

Figure 3:
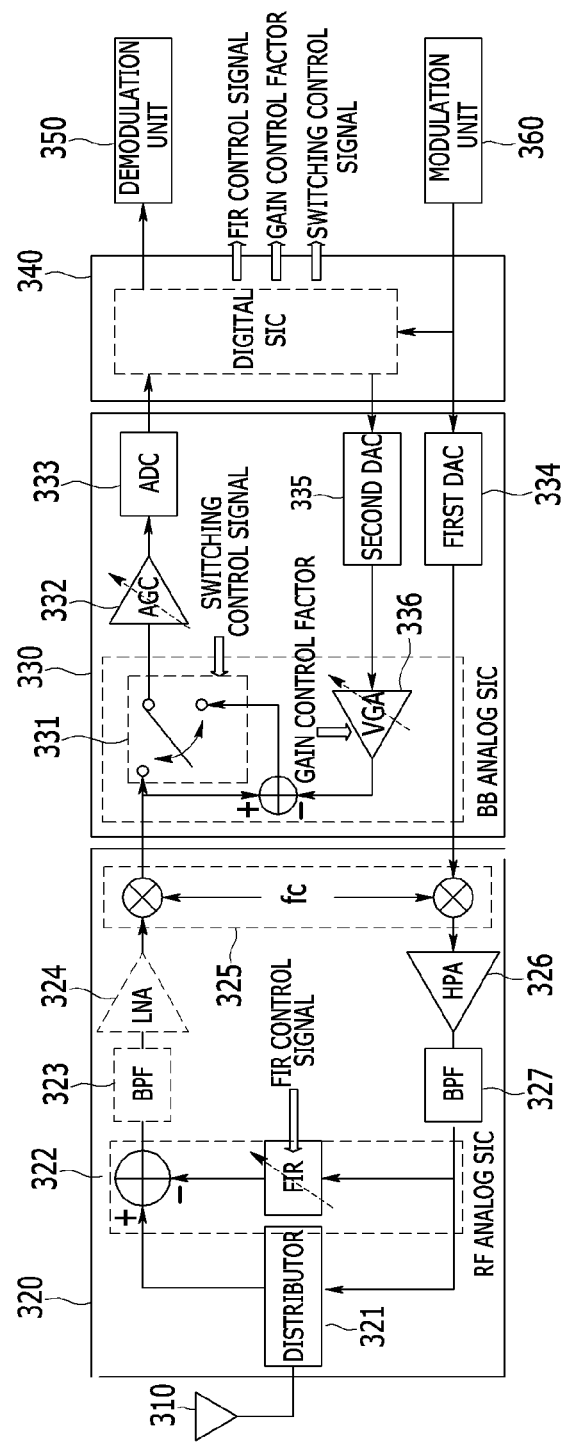
FIG. 3 is a view illustrating an IFD transmitting/receiving apparatus according to an exemplary embodiment.

FIG. 3 is a view illustrating an IFD transmitting/receiving apparatus according to an exemplary embodiment.

Referring to FIG. 3, an IFD transmitting/receiving apparatus 300 according to an exemplary embodiment includes an antenna unit 310, a radio frequency (RF) analog circuit unit 320, a baseband analog circuit unit 330, and a baseband digital circuit unit 340. Here, the IFD transmitting/receiving apparatus 300 may be divided into an RF area and a baseband area with respect to a carrier frequency $f_c$.

The antenna unit 310 includes a single antenna for signal transmission/reception, and thus, an SIC gain is not generated in the antenna unit 310. When the antenna unit 310 includes a total of two antennas each for transmission and reception, the scheme is not different from HD scheme employing a 2×2 multi-input multi-output (MIMO) spatial multiplexing in the aspect of spectrum efficiency in an ideal environment in which there is no correlation in channels between antennas. Also, for the IFD transmitting/receiving apparatus 300 that may be installed in a small device, the antenna unit 310 needs to be implemented as a single antenna. In detail, in a case in which a transmission antenna and a reception antenna are differentiated to separately exist, a size of the IFD transmitting/receiving apparatus 300 may be determined by a distance between the antennas, and thus, limiting conditions for the IFD transmitting/receiving apparatus 300 to be installed in a small device occur.

The RF analog circuit unit 320 includes a distributor 321, an RF analog SIC unit 322, band-pass filters (BPFs) 323 and 327, a low noise amplifier (LNA) 324, a signal processing submodule 325 including a mixer, an integrator, and a local oscillator (LO), and a high power amplifier (HPA) 326.

The distributor 321 separates a transmission signal and a reception signal. In detail, the distributor 321 delivers a transmission signal generated by a transmission module to the antenna unit 310, and delivers a reception signal received through the antenna unit 310 to a reception module. Here, due to a hardware limitation, a signal leakage may occur in the distributor 321 and a transmission signal (that is, a self-interference signal) may be introduced to the reception module. The distributor 321 may be implemented as an analog element and include, for example, a circulator or an electrical balance duplexer (EBD) including a hybrid transformer and a balance network. In an exemplary embodiment, as the distributor 321, any analog element and circuit having a function similar to that of the circulator or the EBD may be included in the coverage of the present invention.

The RF analog SIC unit 322 cancels a self-interference signal introduced to a reception module through the distributor from an RF analog area by using the FIR filter. In an exemplary embodiment, for example, an FIR filter may be implemented with taps in which N number of delay lines are used and attenuators respectively connected to the taps such that the FIR filter may be simply designed in order to prevent a degradation of performance due to variability of a hardware element. Here, an FIR control signal transmitted to the attenuators corresponding to the respective taps is generated by a baseband digital circuit unit 340 (or a digital SIC submodule included in the baseband digital circuit unit). Thus, an interworking relationship may be formed between the RF analog circuit unit 320 and the baseband digital circuit unit 340. In a case in which the distributor 321 is implemented as a circulator, an input signal of the RF analog SIC unit 322 may be a signal which has passed through the BPF 327, and in a case in which the distributor 321 is implemented as an EBD, an input signal of the RF analog SIC unit 322 may be a signal which has been generated within the EBD or a signal which has passed through the BPF 327.

The BPFs 323 and 327 filter an input signal to a desired band.

The LNA 324 amplifies an input signal having a small magnitude to reduce noise. In an exemplary embodiment, an LNA may be omitted or provided according to characteristics of a signal input after the RF analog SIC, and may also be implemented as a variable gain amplifier (VGA) according to circumstances.

The HPA 326 amplifies a transmission signal which has been converted into an RF signal.

In the signal processing submodule 325, the mixer performs mathematical multiplication on a baseband analog signal delivered from the baseband analog circuit unit and a sine wave signal corresponding to the carrier frequency $f_c$ generated by LO. In the signal processing submodule 325, the integrator may perform mathematical multiplication on a signal delivered from the LNA and a sine wave signal corresponding to the carrier frequency $f_c$ generated by the LO and perform mathematical integration at every time interval corresponding to a period of the sine wave.

The baseband analog circuit unit 330 may include a switch 331, an automatic gain controller (AGC) 332, an analog-to-digital converter (ADC) 333, a first digital-to-analog converter (DAC) 334, a second DAC 335, and a variable gain amplifier (VGA) 336. In FIG. 3, a reception signal is input to the AGC 332 through the switch 331, but here, the switch 331 and the AGC 332 may be interchanged in position.

The switch 331 may connect a first terminal or a second terminal to the AGC 332 under the control of a switching control signal. Here, the first terminal is a terminal connected to the RF analog circuit unit 320, and the second terminal is a terminal connected to the VGA 336. The switching control signal may be determined according to a difference between a strength level of a signal input to the baseband digital circuit unit 340 and a strength level of a signal output from the baseband digital circuit unit 340. In detail, when the difference between the levels of the input and output signals of the baseband digital circuit unit 340 is smaller than a predetermined threshold value (lower or less than), the switching control signal may switch the switch 331 to the first terminal (that is, toward the RF analog circuit unit), and when the difference between the levels of the input and output signals of the baseband digital circuit unit 340 is greater than the predetermined threshold value (higher or in excess of), the switching control signal may switch the switch 331 to the second terminal (that is, toward the VGA).

The AGC 332 adjusts a gain of the input signal to a desired reference level.

The ADC 333 converts an analog signal into a digital signal and delivers the converted digital signal to the baseband digital circuit unit 340.

The first DAC 334 converts a digital signal received from a modulation unit 360 into an analog signal.

In general, it is difficult to obtain a sufficient SIC gain from the RF analog circuit unit, and thus, a self-interference signal having a strength level higher than that of a desired signal exists in the baseband analog circuit unit 330. That is, a reception signal of the baseband analog circuit unit 330 is mainly a self-interference signal. In this case, the AGC 332 adjusts a gain according to a valid signal level of the self-interference signal, and the gain-adjusted baseband analog signal may be input to the ADC, sampled and quantized, and subsequently converted into a digital signal. Here, a quantization error may occur by a bit resolution corresponding to a difference βdB between the strength levels of an input signal and an output signal of the baseband digital circuit unit 340. For example, in a case in which a signal level of 6 dB per bit is expressed, if a difference between strength levels is 24 dB, a 4-bit quantization error may occur.

In an IFD transmitting/receiving apparatus according to an exemplary embodiment, a linear component and a non-linear component of a transmission signal may be canceled from a reception signal delivered from the RF analog circuit unit 320 to the baseband analog circuit unit 330 by using the second DAC 335 and the VGA.

First, the second DAC 335 may convert a digital signal delivered from the baseband digital circuit unit 340 into an analog signal and delivers the converted analog signal to the VGA 336. Here, the digital signal delivered from the baseband digital circuit unit 340 includes a transmission signal (linear component) generated by the modulation unit 360 and a transmission signal (non-linear component) estimated through digital SIC. That is, the second DAC 335 delivers an analog signal of a composite signal including the linear component of a self-interference signal based on the original transmission signal and the non-linear component of the self-interference signal obtained through digital SIC to the VGA 336 so that the self-interference signal due to the transmission signal may be canceled from the reception signal delivered from the RF analog circuit unit 320.

Thereafter, the VGA 336 controls a gain of the self-interference signal delivered from the second DAC 335. Here, the gain control of the VGA 336 may be determined according to a gain control coefficient generated on the basis of a difference between the strength levels of the input and output signals from the baseband digital circuit unit 340. For example, the gain control coefficient may be determined as expressed by Equation 1 below.

$$\text{gain control coefficient} = \beta - \rho[dB], (0 \leq \rho << \beta) \quad \text{(Equation 1)}$$

In Equation 1, $\rho$ denotes an estimation error generated when the self-interference signal is synthesized, and the IFD transmitting/receiving apparatus according to an exemplary embodiment may prevent distortion of the reception signal by reflecting an estimation error with respect to the synthesized self-interference signal.

The baseband digital circuit unit 340 performs digital SIC. In detail, upon receiving the transmission signal generated by the modulation unit 360, the baseband digital circuit unit 340 estimates a channel of a self-interference signal, and synthesizes a linear component and a non-linear component of the self-interference signal. Also, the baseband digital circuit unit 340 generates an FIR control signal of the FIR filter included in the RF analog circuit unit 320, generates a switching control signal for controlling a switch included in the baseband analog circuit unit 330, and generates a gain control signal for controlling a gain of the VGA 336 included in the baseband analog circuit unit 330.

The demodulation unit 350 may perform demodulation and decoding on a reception signal, and the modulation unit 360 may perform encoding and modulation on a transmission signal.

Figure 4:
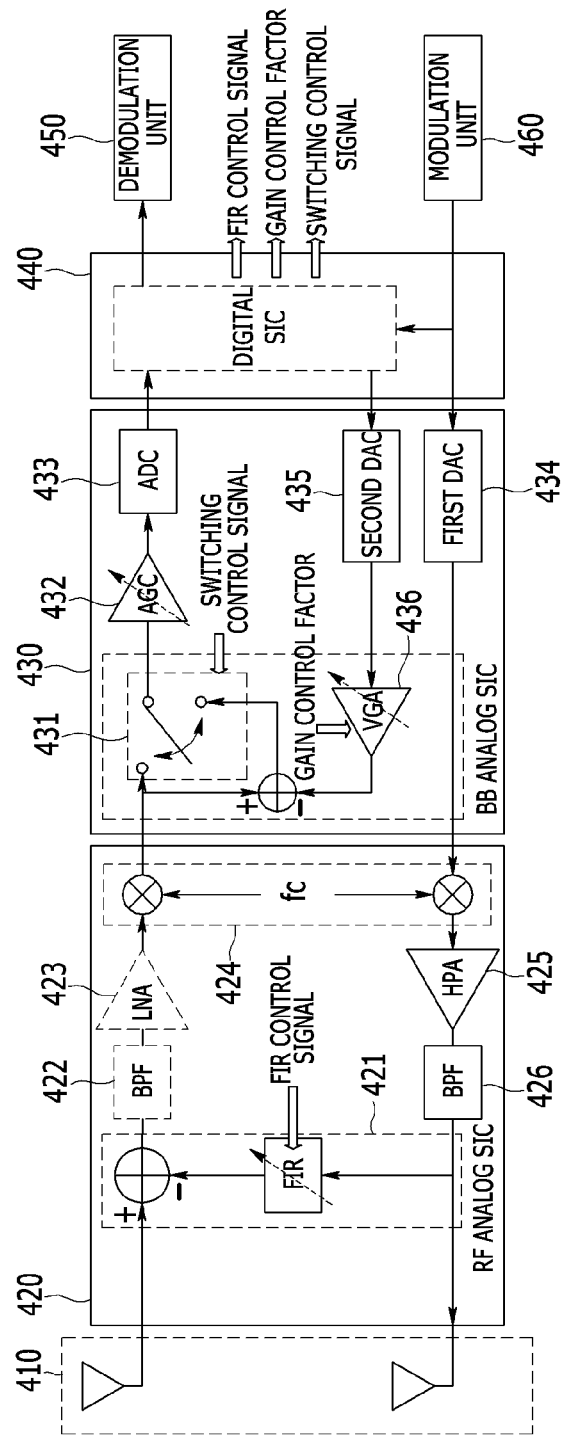
FIG. 4 is a view illustrating an IFD transmitting/receiving apparatus according to another exemplary embodiment.

FIG. 4 is a view illustrating an IFD transmitting/receiving apparatus according to another exemplary embodiment.

Referring to FIG. 4, an IFD transmitting/receiving apparatus 400 according to another exemplary embodiment includes an antenna unit 410, an RF analog circuit unit 420, a baseband analog circuit unit 430, and a baseband digital circuit unit 440. Here, the IFD transmitting/receiving apparatus may be divided into an RF area and a baseband area with respect to a carrier frequency $f_c$.

The antenna unit 410 includes one transmission antenna and one reception antenna. Thus, the antenna unit 410 may obtain an SIC gain according to a distance between the two antennas. However, since the antenna unit 410 includes one transmission antenna and one reception antenna, the scheme is similar to the HD scheme employing 2×2 MIMO spatial multiplexing in the aspect of spectrum efficiency in an ideal environment in which there is no correlation in channels between antennas.

The RF analog circuit unit includes an RF analog SIC unit 421, BPFs 422 and 426, an LNA 423, a signal processing submodule 424, and an HPA 425.

The RF analog SIC unit 421 cancels a self-interference signal introduced to the reception module through the antenna unit 410, in an analog area. In another exemplary embodiment, for example, an FIR filter may be implemented with taps in which N number of delay lines are used and attenuators respectively connected to the taps such that the FIR filter may be simply designed in order to prevent a degradation of performance due to variability of a hardware element. Here, an FIR control signal transmitted to the attenuators corresponding to the respective taps is generated by a baseband digital circuit unit 440 (or a digital SIC submodule included in the baseband digital circuit unit). Thus, an interworking relationship may be formed between the RF analog circuit unit 420 and the baseband digital circuit unit 440. Also, an input signal of the RF analog SIC unit 421 is a signal which has been output from the BPF 426.

The BPFs 423 and 427 filter an input signal to a desired band.

The LNA 424 amplifies an input signal having a small magnitude to reduce noise. In an exemplary embodiment, an LNA may be omitted or provided according to characteristics of a signal input after the RF analog SIC, and may also be implemented as a variable gain amplifier (VGA) according to circumstances.

The HPA 426 amplifies a transmission signal which has been converted into an RF signal.

The signal processing submodule 425 includes a mixer, an integrator, and an LO. In the signal processing submodule 425, the mixer performs mathematical multiplication on a baseband analog signal delivered from the baseband analog circuit unit and a sine wave signal corresponding to the carrier frequency fc generated by LO. In the signal processing submodule 425, the integrator may perform mathematical multiplication on a signal delivered from the LNA and a sine wave signal corresponding to the carrier frequency $f_c$ generated by the LO and perform mathematical integration at every time interval corresponding to a period of the sine wave.

The baseband analog circuit unit 430 may include a switch 431, an AGC 432, an ADC 433, a first DAC 434, a second DAC 435, and a VGA 436. In FIG. 4, a reception signal is input to the AGC 432 through the switch 431, but here, the switch 431 and the AGC 432 may be interchanged in position.

The switch 431 may connect a first terminal or a second terminal to the AGC 432 under the control of a switching control signal. Here, the first terminal is a terminal connected to the RF analog circuit unit 420, and the second terminal is a terminal connected to the VGA 436. The switching control signal may be determined according to a difference between a strength level of a signal input to the baseband digital circuit unit 440 and a strength level of a signal output from the baseband digital circuit unit 440. In detail, when the difference between the levels of the input and output signals of the baseband digital circuit unit 440 is smaller than a predetermined threshold value (lower or less than), the switching control signal may switch the switch 431 to the first terminal, and when the difference between the levels of the input and output signals of the baseband digital circuit unit 440 is greater than the predetermined threshold value (higher or in excess of), the switching control signal may switch the switch 431 to the second terminal.

The AGC 432 adjusts a gain of the input signal to a desired reference level.

The ADC 433 converts an analog signal into a digital signal and delivers the converted digital signal to the baseband digital circuit unit 440.

The first DAC 434 converts a digital signal received from a modulation unit 460 into an analog signal.

The second DAC 435 may convert a digital signal delivered from the baseband digital circuit unit 440 into an analog signal and delivers the converted analog signal to the VGA 436. Here, the digital signal delivered from the baseband digital circuit unit 440 includes a transmission signal (linear component) generated by the modulation unit 460 and a transmission signal (non-linear component) estimated through digital SIC. That is, the second DAC 435 delivers an analog signal of a composite signal including the linear component of a self-interference signal based on the original transmission signal and the non-linear component of the self-interference signal obtained through digital SIC to the VGA 436 so that the self-interference signal due to the transmission signal may be canceled from the reception signal delivered from the RF analog circuit unit 420.

Thereafter, the VGA 436 controls a gain of the self-interference signal delivered from the second DAC 435. Here, the gain of the VGA 436 may be determined according to a gain control coefficient generated on the basis of a difference between the strength levels of the input and output signals from the baseband digital circuit unit 440.

The baseband digital circuit unit 440 performs digital SIC and generates an FIR control signal, a switching control signal, and a gain control signal.

Figure 5:
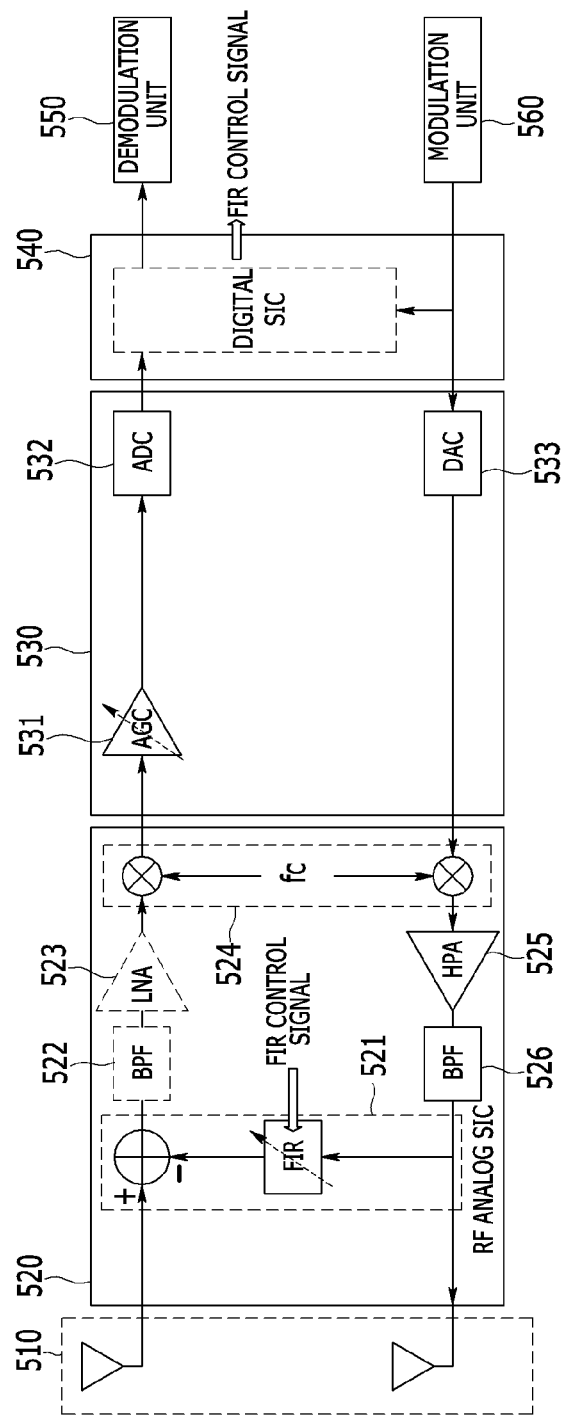
FIG. 5 is a view illustrating an IFD transmitting/receiving apparatus according to another exemplary embodiment.

FIG. 5 is a view illustrating an IFD transmitting/receiving apparatus according to another exemplary embodiment.

In the IFD transmitting/receiving apparatus according to another exemplary embodiment illustrated in FIG. 5, a self-interference cancellation gain may be obtained from an antenna unit 510 including one transmission antenna and one reception antenna and a self-interference cancellation gain is also anticipated from an RF analog SIC unit 521 of an RF analog circuit unit 520, and thus, a baseband analog circuit unit 530 may simply include one AGC 531, one ADC 532, and one DAC 533. Here, a reception signal delivered from the RF analog circuit unit 520 is adjusted in gain in the AGC 531, converted into a digital signal in the ADC 532, and subsequently delivered to the baseband digital circuit unit 540. A transmission signal output from a modulation unit 560 is delivered to the DAC 533 of the baseband analog circuit unit 530, converted into an analog signal, and subsequently delivered to the RF analog circuit unit 520.

In the IFD transmitting/receiving apparatus 500 according to another exemplary embodiment illustrated in FIG. 5, the baseband digital circuit unit 540 may perform digital SIC on a reception signal in consideration of the transmission signal output from the modulation unit 560 in a digital area, and generate an FIR control signal for an FIR filter of the RF analog SIC unit 521.

Figure 6:
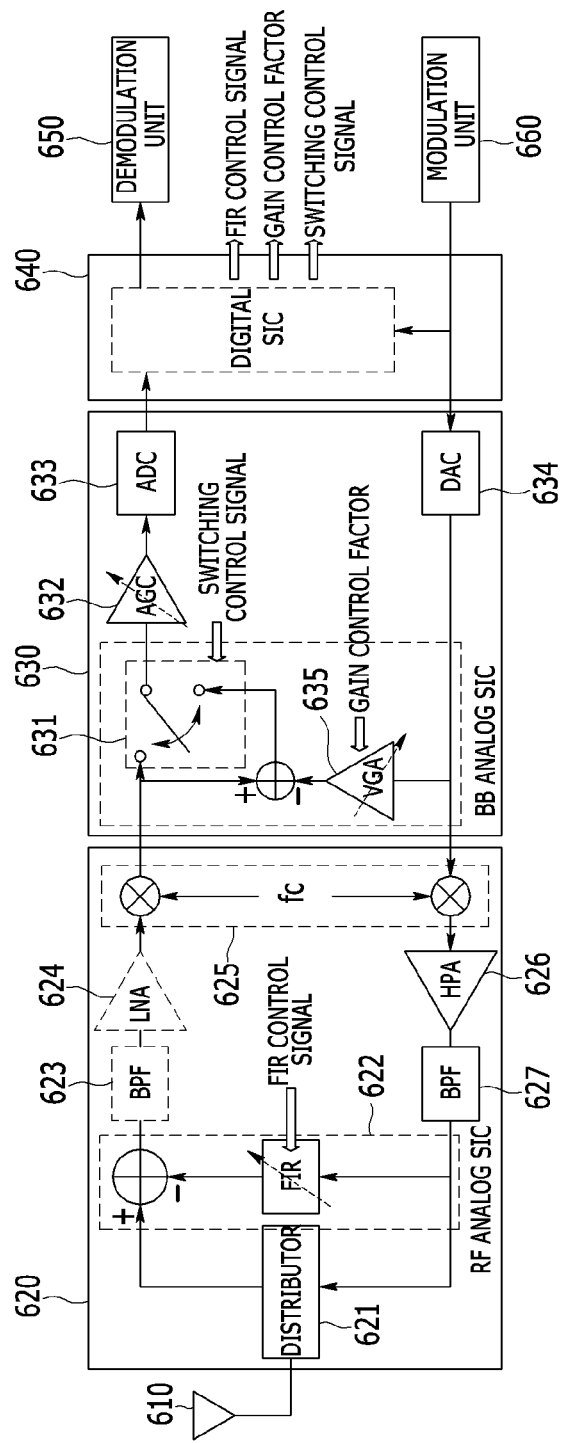
FIG. 6 is a view illustrating an IFD transmitting/receiving apparatus according to another exemplary embodiment.

FIG. 6 is a view illustrating an IFD transmitting/receiving apparatus according to another exemplary embodiment.

Referring to FIG. 6, an IFD transmitting/receiving apparatus 600 according to an exemplary embodiment includes an antenna unit 610, an RF analog circuit unit 620, a baseband analog circuit unit 630, and a baseband digital circuit unit 640. Here, the IFD transmitting/receiving apparatus may be divided into an RF area and a baseband area with respect to a carrier frequency $f_c$.

The antenna unit 610 includes one antenna for signal transmission and reception, and thus, an SIC gain is not generated in the antenna unit 610.

The RF analog circuit unit 620 includes a distributor 621, an RF analog SIC unit 622, BPFs 623 and 627, an LNA 624, a signal processing submodule 625, and an HPA 626.

The distributor 621 separates a transmission signal and a reception signal. In detail, the distributor 621 delivers a transmission signal generated by a transmission module to the antenna unit 610, and delivers a reception signal received through the antenna unit 610 to a reception module.

The RF analog SIC unit 622 cancels a self-interference signal introduced to a reception module through the distributor from the reception signal in an RF analog area by using the FIR filter.

The BPFs 623 and 627 filter an input signal to a desired band.

The LNA 624 amplifies an input signal having a small magnitude to reduce noise. In an exemplary embodiment, an LNA may be omitted or provided according to characteristics of a signal input after the RF analog SIC, and may also be implemented as a variable gain amplifier (VGA) according to circumstances.

The HPA 626 amplifies a transmission signal which has been converted into an RF signal.

In the signal processing submodule 625, the mixer performs mathematical multiplication on a baseband analog signal delivered from the baseband analog circuit unit and a sine wave signal corresponding to the carrier frequency fc generated by LO. In the signal processing submodule 625, the integrator may perform mathematical multiplication on a signal delivered from the LNA and a sine wave signal corresponding to the carrier frequency fc generated by the LO and perform mathematical integration at every time interval corresponding to a period of the sine wave.

The baseband analog circuit unit 630 includes a switch 631, an AGC 632, an ADC 633, a DAC 634, and a VGA 635.

In FIG. 6, a reception signal is input to the AGC 632 through the switch 631, but here, the switch 631 and the AGC 632 may be interchanged in position.

The switch 631 may connect a first terminal or a second terminal to the AGC 632 under the control of a switching control signal. Here, the first terminal is a terminal connected to the RF analog circuit unit 620, and the second terminal is a terminal connected to the VGA 635. The switching control signal may be determined according to a difference between a strength level of a signal input to the baseband digital circuit unit 640 and a strength level of a signal output from the baseband digital circuit unit 640. In detail, when the difference between the levels of the input and output signals of the baseband digital circuit unit 640 is smaller than a predetermined threshold value (lower or less than), the switching control signal may switch the switch 631 to the first terminal, and when the difference between the levels of the input and output signals of the baseband digital circuit unit 640 is greater than the predetermined threshold value (higher or in excess of), the switching control signal may switch the switch 631 to the second terminal.

The AGC 632 adjusts a gain of the reception signal delivered from the RF analog circuit unit 620 through the switch 631 to a desired level.

The ADC 633 converts the reception signal having the gain controlled to have a desired level into a digital signal, and delivers the converted digital signal to the baseband digital circuit unit 640.

In general, it is difficult to obtain a sufficient SIC gain from the RF analog circuit unit, and thus, a self-interference signal having a strength level higher than that of a desired signal exists in the baseband analog circuit unit 630. That is, a reception signal of the baseband analog circuit unit 630 is mainly a self-interference signal. In this case, the AGC 632 adjusts a gain according to a valid signal level of the self-interference signal, and the gain-adjusted baseband analog signal may be input to the ADC, sampled and quantized, and subsequently converted into a digital signal. Here, a quantization error may occur by a bit resolution corresponding to a difference βdB between the strength levels of an input signal and an output signal of the baseband digital circuit unit 640. For example, in a case in which a signal level of 6 dB per bit is expressed, if a difference between strength levels is 24 dB, a 4-bit quantization error may occur.

In the IFD transmitting/receiving apparatus according to another exemplary embodiment, the self-interference signal generated due to the transmission signal may be canceled from the reception signal by using the DAC 634 and the VGA 635.

The DAC 634 converts the transmission signal output from the modulation unit 660 into an analog signal, and inputs the converted analog signal to the VGA 635.

The VGA 635 controls a gain of the converted analog signal from the DAC 634, and thereafter, the gain-controlled analog signal is canceled from the reception signal. Here, the gain control of the VGA 635 may be determined according to a gain control coefficient generated on the basis of a difference between the strength levels of the input and output signals from the baseband digital circuit unit 640. A gain control coefficient may be determined as expressed by Equation 1.

In the IFD transmitting/receiving apparatus 600 according to another exemplary embodiment illustrated in FIG. 6, the baseband digital circuit unit 640 may perform digital SIC on the reception signal in a digital area in consideration of the transmission signal output from the modulation unit 660. Also, the baseband digital circuit unit 640 generates an FIR control signal, a switching control signal, and a gain control signal.

Figure 7:
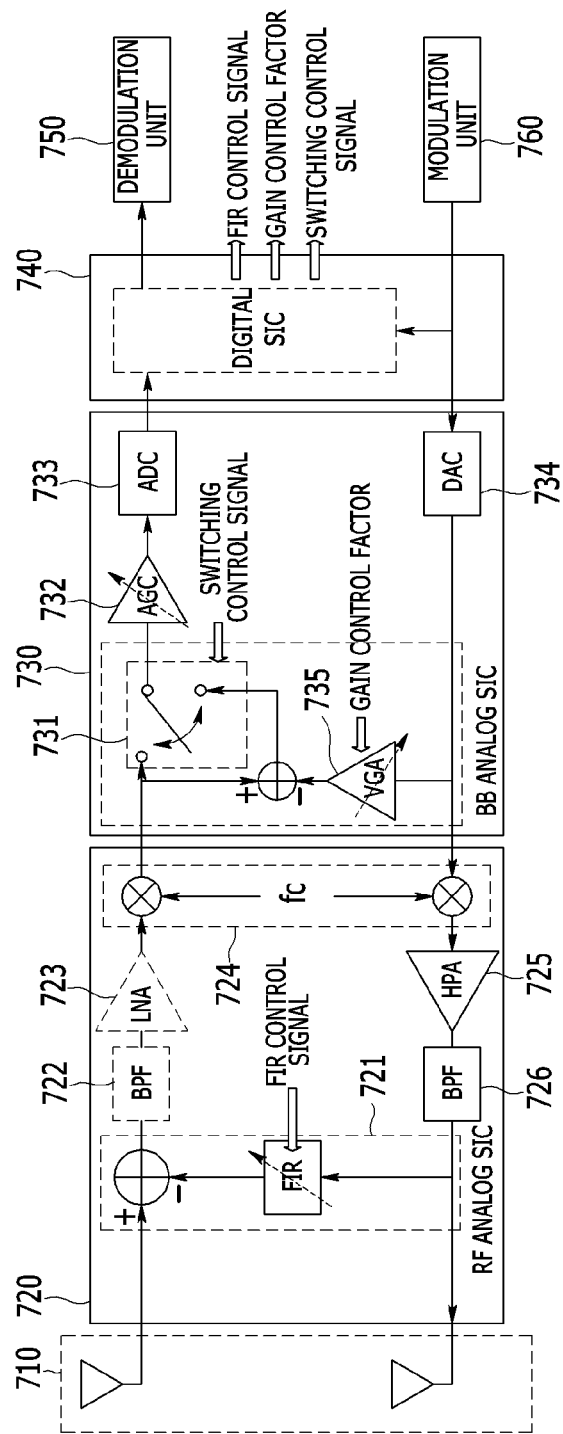
FIG. 7 is a view illustrating an IFD transmitting/receiving apparatus according to another exemplary embodiment.

FIG. 7 is a view illustrating an IFD transmitting/receiving apparatus according to another exemplary embodiment.

Referring to FIG. 7, an IFD transmitting/receiving apparatus 700 according to another exemplary embodiment includes an antenna unit 710, an RF analog circuit unit 720, a baseband analog circuit unit 730, and a baseband digital circuit unit 740. Here, the IFD transmitting/receiving apparatus may be divided into an RF area and a baseband area with respect to a carrier frequency $f_c$.

The antenna unit 710 includes one transmission antenna and one reception antenna. Thus, the antenna unit 710 may obtain an SIC gain according to a distance between the two antennas. However, since the antenna unit 710 includes one transmission antenna and one reception antenna, the scheme is similar to the HD scheme employing 2×2 MIMO spatial multiplexing in the aspect of spectrum efficiency in an ideal environment in which there is no correlation in channels between antennas.

The RF analog circuit unit includes an RF analog SIC unit 721, BPFs 722 and 726, an LNA 723, a signal processing submodule 724, and an HPA 725.

The RF analog SIC unit 721 cancels a self-interference signal introduced to the reception module through the antenna unit 710, in an analog area. In another exemplary embodiment, for example, an FIR filter may be implemented with taps in which N number of delay lines are used and attenuators respectively connected to the taps such that the FIR filter may be simply designed in order to prevent a degradation of performance due to variability of a hardware element. Here, an FIR control signal transmitted to the attenuators corresponding to the respective taps is generated by a baseband digital circuit unit 740 (or a digital SIC submodule included in the baseband digital circuit unit). Thus, an interworking relationship may be formed between the RF analog circuit unit 720 and the baseband digital circuit unit 740. Also, an input signal of the RF analog SIC unit 721 is a signal which has been output from the BPF 726.

The BPFs 723 and 727 filter an input signal to a desired band.

The LNA 724 amplifies an input signal having a small magnitude to reduce noise. In an exemplary embodiment, an LNA may be omitted or provided according to characteristics of a signal input after the RF analog SIC, and may also be implemented as a variable gain amplifier (VGA) according to circumstances.

The HPA 726 amplifies a transmission signal which has been converted into an RF signal.

The signal processing submodule 725 includes a mixer, an integrator, and an LO. In the signal processing submodule 725, the mixer performs mathematical multiplication on a baseband analog signal delivered from the baseband analog circuit unit and a sine wave signal corresponding to the carrier frequency fc generated by LO. In the signal processing submodule 725, the integrator may perform mathematical multiplication on a signal delivered from the LNA and a sine wave signal corresponding to the carrier frequency $f_c$ generated by the LO and perform mathematical integration at every time interval corresponding to a period of the sine wave.

The baseband analog circuit unit 730 may include a switch 731, an AGC 732, an ADC 733, a DAC 734, and a VGA 735. In FIG. 7, a reception signal is input to the AGC 732 through the switch 731, but here, the switch 731 and the AGC 732 may be interchanged in position.

The switch 731 may connect a first terminal or a second terminal to the AGC 732 under the control of a switching control signal. Here, the first terminal is a terminal connected to the RF analog circuit unit 720, and the second terminal is a terminal connected to the VGA 735. The switching control signal may be determined according to a difference between a strength level of a signal input to the baseband digital circuit unit 740 and a strength level of a signal output from the baseband digital circuit unit 740. In detail, when the difference between the levels of the input and output signals of the baseband digital circuit unit 740 is smaller than a predetermined threshold value (lower or less than), the switching control signal may switch the switch 731 to the first terminal, and when the difference between the levels of the input and output signals of the baseband digital circuit unit 740 is greater than the predetermined threshold value (higher or in excess of), the switching control signal may switch the switch 731 to the second terminal.

The AGC 732 adjusts a gain of the reception signal delivered from the RF analog circuit unit 720 through the switch 731 to a desired level.

The ADC 733 converts the reception signal having the gain controlled to have a desired level into a digital signal, and delivers the converted digital signal to the baseband digital circuit unit 740.

In general, it is difficult to obtain a sufficient SIC gain from the RF analog circuit unit, and thus, a self-interference signal having a strength level higher than that of a desired signal exists in the baseband analog circuit unit 730. That is, a reception signal of the baseband analog circuit unit 730 is mainly a self-interference signal. In this case, the AGC 732 adjusts a gain according to a valid signal level of the self-interference signal, and the gain-adjusted baseband analog signal may be input to the ADC, sampled and quantized, and subsequently converted into a digital signal. Here, a quantization error may occur by a bit resolution corresponding to a difference βdB between the strength levels of an input signal and an output signal of the baseband digital circuit unit 740. For example, in a case in which a signal level of 6 dB per bit is expressed, if a difference between strength levels is 24 dB, a 4-bit quantization error may occur.

In the IFD transmitting/receiving apparatus according to another exemplary embodiment, the self-interference signal generated due to the transmission signal may be canceled from the reception signal by using the DAC 734 and the VGA 735.

The DAC 734 converts the transmission signal output from the modulation unit 760 into an analog signal, and inputs the converted analog signal to the VGA 735.

The VGA 735 controls a gain of the converted analog signal from the DAC 734, and thereafter, the gain-controlled analog signal is canceled from the reception signal. Here, the gain control of the VGA 735 may be determined according to a gain control coefficient generated on the basis of a difference between the strength levels of the input and output signals from the baseband digital circuit unit 740. A gain control coefficient may be determined as expressed by Equation 1.

In the IFD transmitting/receiving apparatus 700 according to another exemplary embodiment illustrated in FIG. 7, the baseband digital circuit unit 740 may perform digital SIC on the reception signal in a digital area in consideration of the transmission signal output from the modulation unit 760. Also, the baseband digital circuit unit 740 generates an FIR control signal, a switching control signal, and a gain control signal.

According to the above descriptions, the self-interference signal introduced to the reception signal may be mostly canceled through the self-interference cancellation in the RF analog circuit area, the quantization noise reduction in the baseband analog area, and the residual self-interference cancellation in the baseband digital area, and effective reception performance may be maintained at the same level as that when there is no self-interference.

Figure 8:
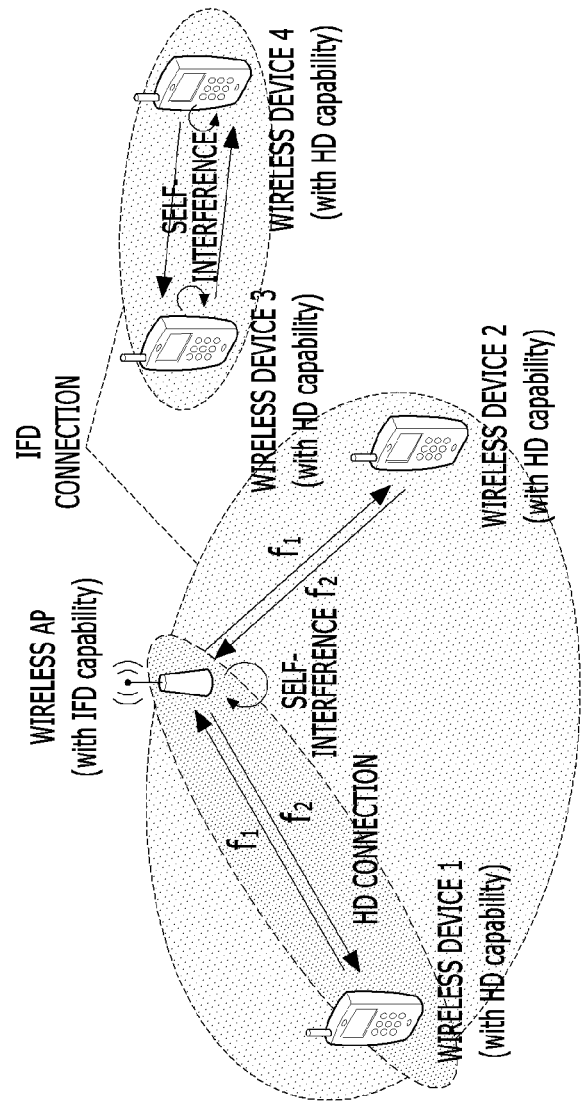
FIG. 8 is a conceptual view illustrating a network in which signals are transmitted and received in an IFD manner and an HD manner.

FIG. 8 is a conceptual view illustrating a network in which signals are transmitted and received in an IFD manner and an HD manner.

Referring to FIG. 8, a wireless device 1 communicates with a wireless access point (AP) or a base station (BS) in an HD manner. The wireless device 1 may use $f_1/f_2$ or $f_2/f_1$ as transmission/reception frequencies at a time of $t_1$ in case of frequency division duplex (FDD), and may transmit/receive a signal at a time of $t_1/t_2$ or $t_2/t_1$ at a frequency of $f_1$ in case of time division duplex (TDD). The HD scheme performs transmission/reception by dividing time or frequency, having an advantage in that interference does not occur during transmission/reception, but time or frequency may be wasted. In FIG. 8, a wireless device 2 and the AP and a wireless device 3 and a wireless device 4 communicate with each other in the IFD manner. For example, a wireless AP having the IFD function may perform transmission/reception at a frequency of $f_1$ at a time of $t_1$ in case of FDD, and may perform transmission/reception at a time of $t_1$ at a frequency of $f_1$ in case of TDD. That is, the IFD scheme is a method for enhancing information transmission efficiency without wasting time or frequency for the purpose of transmission/reception, which is a core technology of $5^{th}$ generation (5G) communication aiming at increasing system capacity to 1000 folds.

Figure 9:
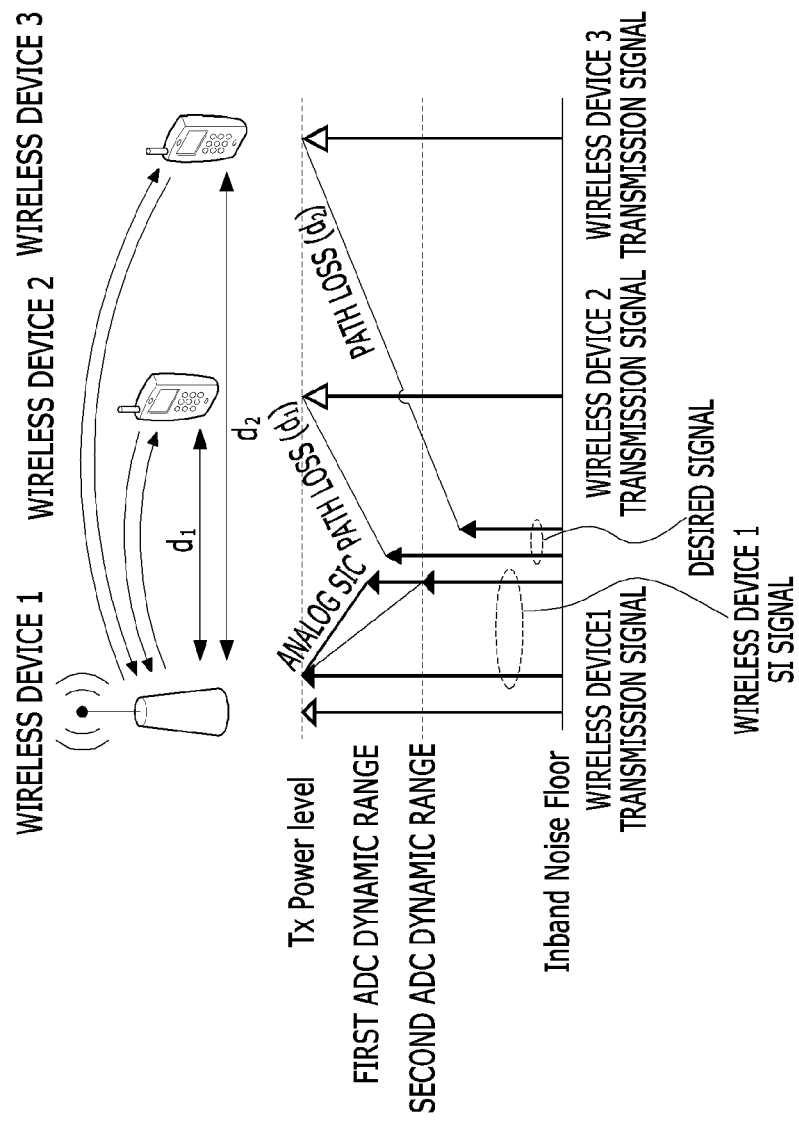
FIG. 9 is a conceptual view illustrating a quantization error of a desired reception signal according to an exemplary embodiment.

FIG. 9 is a conceptual view illustrating a quantization error of a desired reception signal according to an exemplary embodiment.

The IFD scheme has a problem in that a huge quantization error occurs in a desired signal while a reception signal sequentially passes through an automatic gain controller (AGC) and an analog-to-digital converter (ADC), as well as a problem of self-interference. A signal received by an IFD transceiver may be expressed as a mathematical addition of a self-interference signal and a desired signal (that is, a desired signal). Here, in a case in which a magnitude of the self-interference signal is greater by tens of dB than that of the desired signal, the AGC and ADC of a receiver may operate according to the magnitude of the self-interference signal, and thus, a quantization error of the desired signal may be increased. Regarding the desired signal, the quantization error may occur in the IFD transceiver in the following two cases. First, an SIC gain of an antenna of the IFD transceiver and an SIC gain of the analog circuit area are naturally small.

Referring to FIG. 9, ADC levels are formed according to a first ADC dynamic range. In this case, a quantization error may occur in a desired signal. Second, SIC gains of an antenna and an analog circuit area are large; however, since a distance between communication devices is long, a magnitude of a desired signal o which ADC is performed is smaller than that of an SI signal. In this case, an ADC level may be formed like a second ADC dynamic range.

In the IFD scheme, when a quantization error occurs in the desired signal, a high order modulation scheme (for example, 16 quadrature amplitude modulation (QAM), 32 QAM or 64 QAM) cannot be applied in data transmission, making it difficult to enhance link capacity to double, compared with HD. In order to reduce the quantization error of the desired signal by the ADC, SIC needs to be performed to be less than a magnitude level of the desired signal in the analog circuit area before the ADC. However, the SIC in the analog circuit area may have a limitation in an obtainable gain, or an SIC technique incurring high cost (for example, a large capacity), high calculation complexity, and high power consumption needs to be applied to increase the SIC gain.

Figure 10:
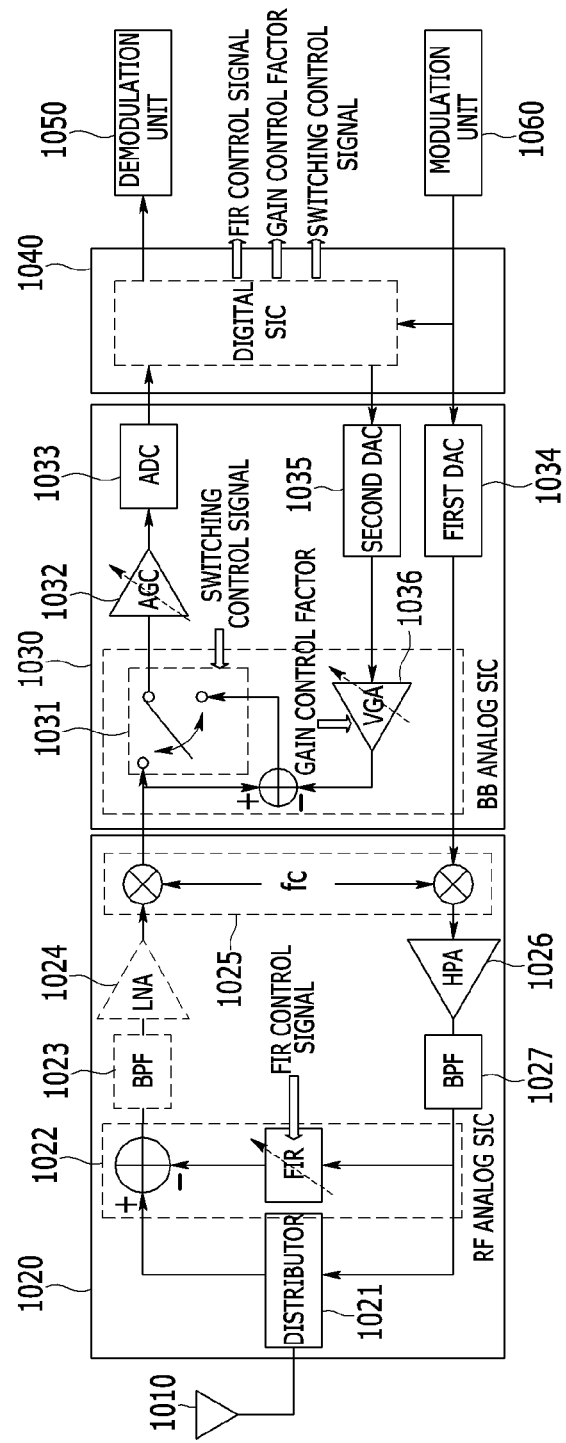
FIG. 10 is a view illustrating an IFD transmitting/receiving apparatus according to another exemplary embodiment.

FIG. 10 is a view illustrating an IFD transmitting/receiving apparatus according to another exemplary embodiment.

Referring to FIG. 10, the IFD transmitting/receiving apparatus according to another exemplary embodiment includes an antenna 1010, an RF analog circuit unit 1020, a baseband analog circuit unit 1030, and a baseband digital circuit unit 1040.

The antenna 1010 may transmit a signal generated in the IFD transmitting/receiving apparatus, and deliver a received signal to the IFD transmitting/receiving apparatus. That is, the IFD transmitting/receiving apparatus according to another exemplary embodiment may transmit and receive a signal through one antenna 1010.

The RF analog circuit unit 1020 includes a distributor 1021, an RF analog SIC unit 1022, a high power amplifier (HPA) 1023, a low noise amplifier (LNA) 1024, and an up/down converter 1025.

The distributer 1021 may separate an SI signal introduced from the IFD transmitting/receiving apparatus, and may be directly connected to the antenna 1010. As the distributer 1021, a circulator, or an electrical balance duplexer (EBD) including a hybrid transformer or a balance network may be used. However, without being limited thereto, any element or circuit having a function similar thereto may also be used.

The RF analog SIC unit 1022 performs a function of an analog finite impulse response (FIR) filter or a function similar thereto, and may include n number of delay taps and n number analog attenuators. That is, the RF analog SIC unit 1022 may perform SIC on a self-interference signal of a transmission signal.

The HPA 1023 amplifies a transmission signal which has been converted into an RF signal, delivered from the up/down converter 1025.

The LNA 1024 lowers noise of an input signal delivered from the RF analog SIC unit 1022. Here, the input signal of the LNA 1024 may be a signal obtained by canceling a self-interference signal of a transmission signal from a reception signal received by the antenna 1010. That is, the input signal of the LNA 1024 may be a result obtained by subtracting a transmission signal to which the RF analog SIC unit 1022 has been applied, from a reception signal. The LNA 1024 may serve as a variable gain amplifier (VGA), and may not be included as a component of the IFD according to features of a signal delivered from the RF analog SIC unit 1022.

The up/down converter 1025 includes a mixer used for signal transmission and an integrator used for signal reception. The mixer may perform mathematical multiplication on a baseband analog signal and a sine wave signal corresponding to a carrier frequency, generated by a local oscilloscope (LO). The integrator may perform mathematical multiplication on a signal delivered from the LNA 1024 and the sine wave signal corresponding to the carrier frequency, generated by the LO and perform mathematical integration on a result of the mathematical multiplication at every time interval corresponding to 1 period of a sine wave.

The baseband analog circuit unit 1030 includes a DAC 1031, an ADC 1032, a first AGC 1033, a second AGC 1034, and a switch 1035.

The DAC 1031 converts a digital signal into an analog signal for signal transmission, and the ADC 1032 converts an analog signal into a digital signal for signal reception.

The first AGC 1033 may be positioned between the switch 1035 and the ADC 1032, and adjust a reference power level such that a signal input to the ADC 1032 may operate in a dynamic range of the ADC 1032. When the switch 1035 is connected to a terminal $s_{11}$, the first AGC 1033 adjusts a reference power level such that a signal (for example, a desired signal) output from the RF analog circuit area may be operated in a dynamic range of the ADC 1032. Also, when the switch 1035 is connected to a terminal $s_{12}$, the first AGC 1033 may adjust the reference power level such that the sum of the signal (for example, the signal on which the RF analog SIC has been performed) output from the RF analog circuit area and the signal on which the baseband (BB) analog SIC has been performed may operate in the dynamic range of the ADC 1032. Here, since the first AGC 1033 adjusts the reference power level of the desired signal according to performance of the RF analog SIC unit 1022 and the BB analog SIC, it may have a large gain adjustment range.

The second AGC 1034 performs BB analog SIC on a transmission signal. That is, the second AGC 1034 may adjust the reference power level on an output signal of the DAC 1031. A gain of a signal output from the second AGC 1034 may be determined by a gain control factor, transmitted from the BB digital circuit unit 1040 to the BB analog circuit unit 1030.

The switch 1035 performs a switching operation between the terminals $s_{11}$ and $s_{12}$ according to a switch adjustment algorithm of the BB digital circuit unit 1040. When the switch 1035 is switched to the terminal $s_{11}$, the BB analog circuit unit 1030 may not perform BB analog SIC, and when the switch 1035 is switched to the terminal $s_{12}$, the BB analog circuit unit 1030 may perform BB analog SIC.

The BB digital circuit unit 1040 outputs a gain control factor for controlling a gain of the second AGC 1034, and outputs a switching control signal for controlling the switch 1035. An operation of the BB digital circuit unit 1040 will be described in detail with reference to FIGS. 12 and 13.

Figure 11:
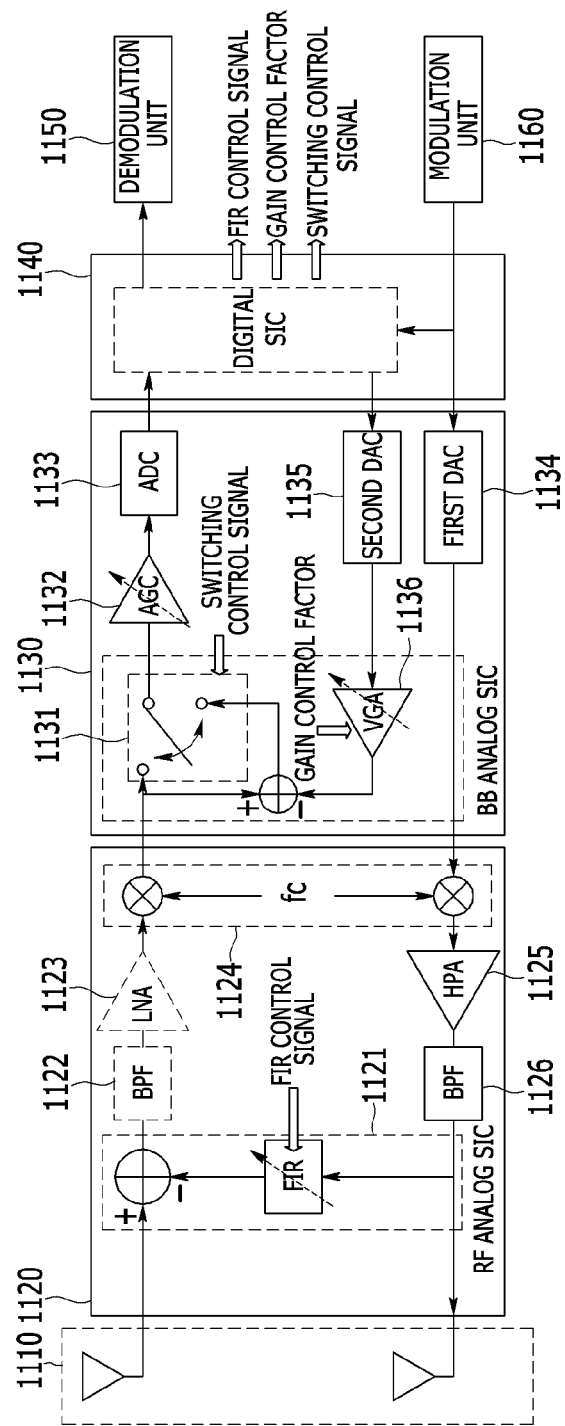
FIG. 11 is a view illustrating an IFD transmitting/receiving apparatus according to another exemplary embodiment.

FIG. 11 is a view illustrating an IFD transmitting/receiving apparatus according to another exemplary embodiment.

Referring to FIG. 11, the IFD transmitting/receiving apparatus according to another exemplary embodiment includes an antenna 1110, an RF analog circuit unit 1120, a BB analog circuit unit 1130, and a BB digital circuit unit 1140.

The antenna 1110 and the RF analog circuit unit 1120 illustrated in FIG. 11 may include the same configuration as those illustrated in FIG. 10. However, unlike that of FIG. 10, the RF analog circuit unit 1120 may be controlled according to an FIR control signal output from the BB digital circuit unit 1140. In the present exemplary embodiment, the FIR control signal is a weight with respect to an FIR filter. That is, in the RF analog circuit unit 1120, the FIR filter may be controlled by delay and weight, and the weight with respect to the FIR filter may be updated on the basis of the FIR control signal generated by the BB digital circuit unit 1140.

Meanwhile, the BB analog circuit unit 1130 included in the IFD transmitting/receiving apparatus according to another exemplary embodiment includes one DAC 1131, a third AGC 1132, a fourth AGC 1133, a fifth AGC 1134, a first ADC 1135 and a second ADC 1136 respectively connected to the third AGC 1132 and the fifth AGC 1134, and a switch 1137.

Like the second AGC 1034 of FIG. 10, the fourth AGC 1133 may perform BB analog SIC on an output signal of the DAC 1131 and may be controlled according to a gain control factor output from the BB digital circuit unit 1140.

Referring to FIG. 11, the switch 1137 included in the IFD transmitting/receiving apparatus according to another exemplary embodiment may be positioned between the BB digital circuit unit and two ADCs, and connect the first ADC 1135 to the BB digital circuit unit 1140 or connect the second ADC 1136 to the BB digital circuit unit 1140 according to a switching control signal from the BB digital circuit unit 1140.

The third AGC 1132 adjusts the reference power level of the signal on which an RF analog SIC 1122 has been performed. That is, when the switch 1137 is switched to the terminal $s_{11}$, the third AGC 1132 may adjust the reference power level of the input signal such that the signal input after the RF analog SIC 1122 is performed thereon is included in the dynamic range of the first ADC 1135. Here, the first ADC 1135, and the third ADC 1132 may operate at a power level of a residual SI signal after the RF analog SIC 1122 (that is, an SI signal remaining after the SIC is performed, in the SI signal of the input signal).

The fifth AGC 1134 adjusts the reference power level of the signal on which the BB analog SIC has been performed. That is, when the switch 1137 is switched to the terminal $s_{12}$, the fifth AGC 1134 may adjust the reference power level of the input signal such that the signal input after the RF analog SIC 1122 and the BB analog SIC are performed is included in the dynamic range of the second ADC 1136. The second ADC 1136 and the fifth AGC 1134 may operate at a power level of the signal input after the RF analog SIC 1122 and the BB analog SIC are performed. Thus, in the IFD transmitting/receiving apparatus according to another exemplary embodiment, a gain adjustment range of the AGC may be divided by the third AGC 1132 and the fifth AGC 1134 so as to be managed. Also, a difference in system responses between the third AGC 1132 and the fifth AGC 1134 may be compensated through a method such as measurement so that the system responses of the two AGCs may be the same.

Figure 12:
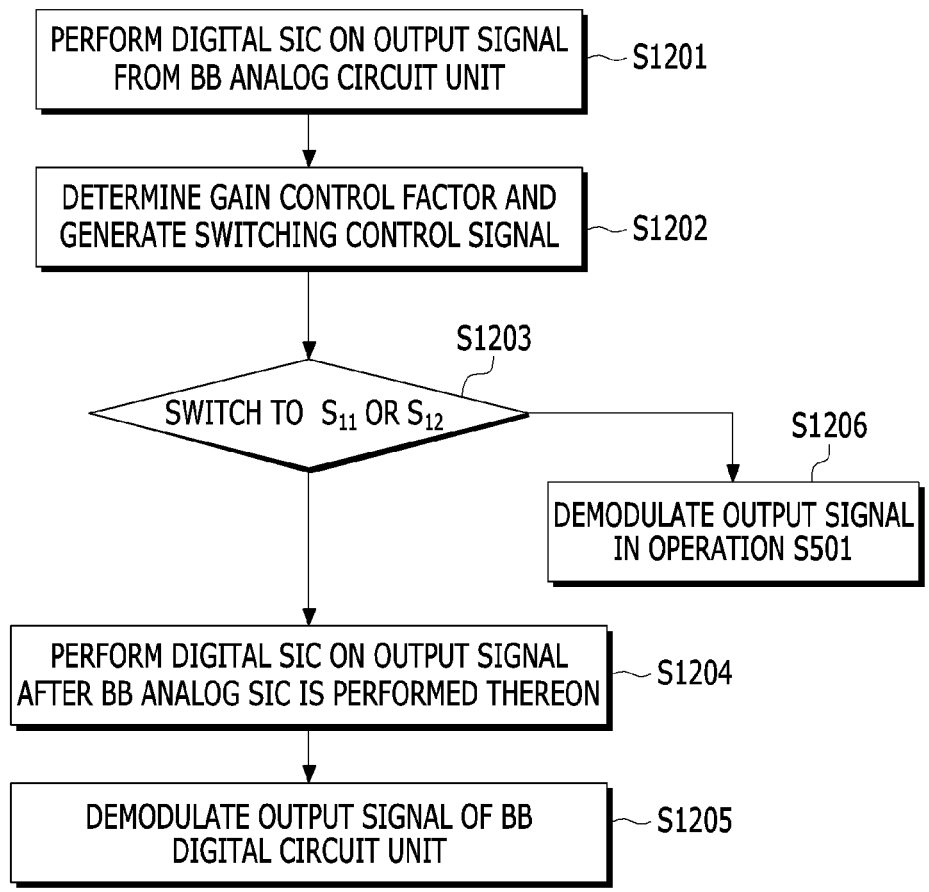
FIG. 12 is a flow chart illustrating an operation method of a baseband digital circuit unit according to an exemplary embodiment.

FIG. 12 is a flow chart illustrating an operation method of a baseband digital circuit unit according to an exemplary embodiment.

Referring to FIG. 12, first, a signal on which RF analog SIC and down-converting have been performed is input to a BB analog circuit unit. A switch is positioned at a terminal $s_{11}$ according to an initial setting, and a signal input to a BB analog circuit unit is input to the BB digital circuit unit through the first AGC and the ADC. Digital SIC is performed on the signal input to the BB digital circuit unit. That is, digital SIC may be performed on the output signal of the BB analog circuit unit in the BB digital circuit unit (S1201). The digital SIC method will be described in detail with reference to FIG. 13.

Next, the BB digital circuit unit determines a gain control factor on the basis of the digital SIC result, and generates a switching control signal (S1202).

When the switch is switched to the terminal $s_{12}$ according to the switching control signal (S1203), BB analog SIC is performed, and digital SIC may be performed again on an output signal after the BB analog SIC is performed (S1204). Thereafter, after the digital SIC is performed again, an output signal output from the BB digital circuit unit may be demodulated (S1205).

Meanwhile, when the switch is maintained at the position of the terminal $s_{11}$ according to the switching control signal, the output signal after the digital SIC performed in step S1201 may be demodulated (S1206).

In an exemplary embodiment, a gain control factor is a value indicating a difference in magnitude between the SI signal input to the BB digital circuit unit and a desired signal. For example, the gain control factor may provide information regarding the number of bits occupied by the desired signal in a digital output signal (for example, 10110011 after ADC. Thus, a degree of a quantization error of the desired signal may be indicated by the gain control factor.

Figure 13:
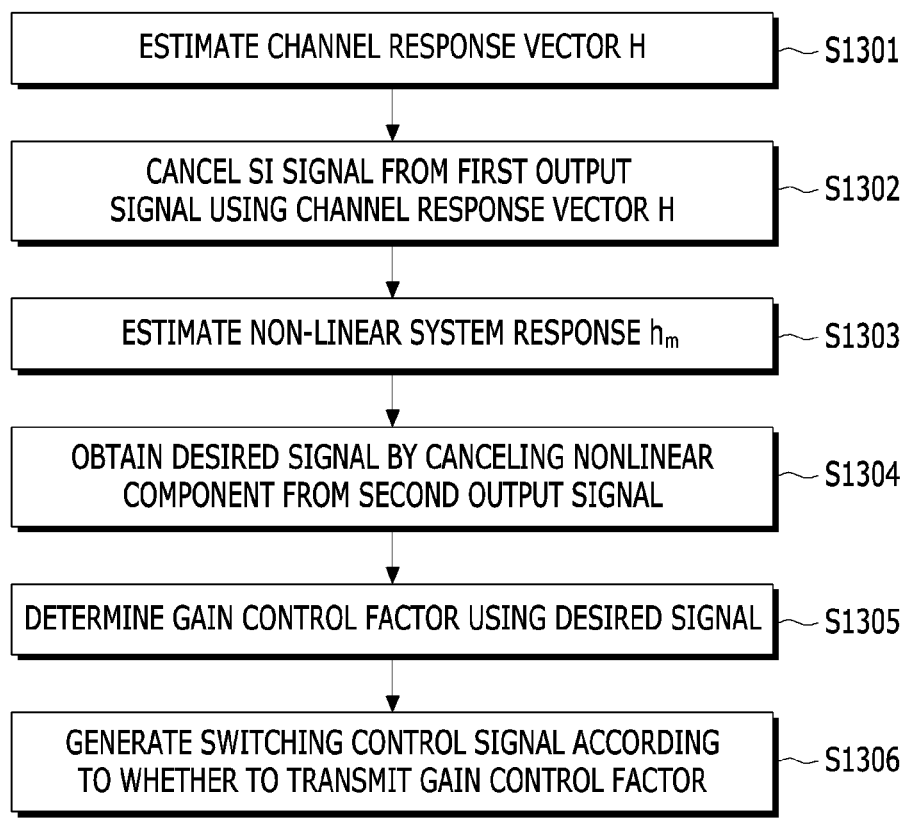
FIG. 13 is a conceptual view illustrating a digital SIC method of a baseband digital circuit unit according to an exemplary embodiment.

FIG. 13 is a conceptual view illustrating a digital SIC method of a baseband digital circuit unit according to an exemplary embodiment.

In an exemplary embodiment, the BB digital circuit unit performs linear cancellation on a first output signal of the BB analog circuit unit input to the BB digital circuit unit to generate a second output signal, and performs non-linear cancellation on the second output signal to obtain a desired signal. Thereafter, the obtained desired signal may be demodulated.

First, the BB digital circuit unit estimates a channel response vector h (h=[h 0, . . . , h N−1]) on the basis of a transmission signal matrix A including a transmission signal vector x (x=[x 0, . . . , x N−1]) and a reception signal $y_1$ ($y_1$=[$y_1$ 0, . . . , $y_1$ N−1]) (S1301). In an exemplary embodiment, it is assumed that the IFD transmitting/receiving apparatus already knows about a signal transmitted from another apparatus, and thus, the transmission signal matrix A is previously known to the IFD transmitting/receiving apparatus, like a preamble of a Wi-Fi network or a pilot signal of a long term evolution (LTE) network. Thus, the BB digital circuit unit of the IFD transmitting/receiving apparatus may estimate a channel response matrix h such that it satisfies Equation 2 below.

$$\min\|(y_1-Ah)\|_2^2 \quad \text{(Equation 2)}$$

In Equation 2, the estimated channel response matrix h needs to be able to minimize a squared value after secondary norm calculation is performed on $y_1$−Ah. Referring to Equation 2, the channel response matrix h able to minimize a difference between a linear product of already known transmission signal matrix A and channel response matrix h and the first output signal (that is, the reception signal) may be estimated.

In an exemplary embodiment, the transmission signal matrix A may be a Toeplitz matrix including k number of memories (that is, a non-causal sample) of a component x of the transmission signal vector. The transmission signal matrix A may be expressed by Equation 3 below.

$$A = \begin{pmatrix} y(-k) & \cdots & y(-1) & x(0) & \cdots & x(k-1) \\ \vdots & \ddots & \vdots & \vdots & \ddots & \vdots \\ x(N-k) & \cdots & x(N-1) & x(N) & \cdots & X(N+k-1) \end{pmatrix} \quad \text{(Equation 3)}$$

Meanwhile, a reception signal $y_1$ is the sum of a linear combination of the transmission signal matrix A and the channel response vector h and additive white Gaussian noise (AWGN) w (w=[w 0, ..., w N−1]), which may be expressed by Equation 4.

$$y_1 = Ah + w \quad \text{(Equation 4)}$$

For example, when the reception signal is a preamble $x_p$ of a Wi-Fi network (preamble matrix is $A_p$), the channel response vector h may be estimated as expressed by Equation 5 below. In another exemplary embodiment, the reception signal may be any type of training signal previously known to a terminal, like a pilot reference signal of an LTE network, or the like, but the present invention is not limited thereto.

$$h = \Sigma(y_{p1}(i) a_{p,i}^\dagger) \quad \text{(Equation 5)}$$

In Equation 5, $y_{p1}(i)$ is ith sample of a received preamble signal $y_{p1}$, and $a_{p,i}^\dagger$ is a pseudo inverse matrix of $A_p$ or ith column vector of a conjugate transpose matrix. Here, as a component of a transmission signal distorted by a non-linear component of an analog element is smaller, an error of the estimated channel response vector h may be minimized.

Thereafter, the BB digital circuit unit linearly cancels an SI signal from the first output signal $y_{d1}$ by using the channel response vector h estimated by Equation 5 (S1302). The linear cancellation may be performed on the first output signal $y_{d1}$ expressed by the mathematical addition of the SI signal and the desired signal, and after a second output signal $y_2$ output after the linear cancellation may be expressed by Equation 6 below.

$$y_2 = y_{d1} - A_d h \quad \text{[Equation 6]}$$

Thereafter, a non-linear component included in the second output signal $y_2$ may be canceled. In the IFD transmitting/receiving apparatus, a self-interference signal may include a component distorted nonlinearly when passed through the RF analog circuit unit and the BB analog circuit unit. That is, the SI signal of the first output signal output from the BB analog circuit unit of the IFD transmitting/receiving apparatus may include both a linear component and a non-linear component. In an exemplary embodiment, in order to cancel the non-linear component from the second output signal $y_2$, the BB digital circuit unit may first estimate a non-linear system response vector $h_m$ (S1303), and here, the non-linear system response vector $h_m$ be estimated as expressed by Equation 7 below.

$$h_m = \Sigma(y_{p2}(i)(a_{p,i}^m)^\dagger) \quad \text{(Equation 7)}$$

In Equation 7, $y_{p2}(i)$ is ith sample of the second output signal $y_2$ and $(a'_{p,i})^\dagger$ is ith column vector of a pseudo inverse matrix of a Toeplitz matrix $A_p^m$ including $x_p^m$ obtained by nonlinearly distorting a preamble $x_p$ in m-order or a conjugate transpose matrix. In an exemplary embodiment, the non-linear system response vector $h_m$ may be estimated according to m order non-linear model such as a Taylor series expansion.

Thereafter, in an exemplary embodiment, the BB digital circuit unit cancels the non-linear component from the second output signal as expressed by Equation 8, on the basis of a Toeplitz matrix $A_d^m$ including the estimated non-linear system response vector $h_m$ and $A_d^m$ obtained by m-order nonlinearly distorting the transmission signal $x_d$ (S1304).

$$y_3 = y_{d2} - A_d^m h_m \quad \text{(Equation 8)}$$

That is, in Equation 8, $y_3$ is a desired signal.

Thereafter, the BB digital circuit unit determines a gain control factor by using the desired signal $y_3$ obtained by canceling the non-linear component (S1305). The gain control factor, a factor for controlling the second AGC (or the fourth AGC) of the BB analog circuit unit, may be calculated as expressed by Equation 9 below.

$$\text{gain control factor} = \frac{\text{power level of desired signal } y_3}{\text{power level of reception signal } y_1} \quad \text{(Equation 9)}$$

Referring to Equation 9, the gain control factor may be determined as a ratio of power levels (that is, magnitudes of average power) of the desired signal and the reception signal. In an exemplary embodiment, the BB digital circuit unit may operate according to a magnitude of the gain control factor as follows.

1. When the gain control factor is greater than or equal to 1 (gain control factor≥1), the BB digital circuit unit determines that average power of the desired signal is greater than or equal to average power of the SI signal and does not transmit the gain control factor the BB analog circuit unit (that is, expiration of gain control factor). Thereafter, $y_3$ output after digital SIC was performed is demodulated.

2. When the gain control factor is greater than a threshold value b (here, 0<b<1) (gain control factor>b), the BB digital circuit unit determines that a difference in average power between the desired signal and the SI signal is not significant and does not transmit the gain control factor to the BB analog circuit unit (that is, expiration of gain control factor) Thereafter, $y_3$ output after digital SIC was performed is demodulated.

3. When the gain control factor is smaller than or equal to the threshold value b (gain control factor≤b), the BB digital circuit unit determines that the difference in average power between the desired signal and the SI signal is significant and delivers the gain control factor to the BB analog circuit unit.

In this disclosure, the example in which the gain control factor is transmitted to the BB analog circuit unit according to a magnitude thereof is described, but whether to transmit the gain control factor may be determined according to an M-quadrature amplitude modulation (QAM) level of the desired signal. For example, when the desired signal is a signal which has been modulated according to a low-order modulation scheme such as binary phase shift keying (BPSK) or quadrature phase shift keying (QPSK), the BB digital circuit unit may not transmit the gain control factor according to circumstances. Also, in addition to the method of determining the gain control factor by the ratio between power levels of reception signals before and after performing SIC, the gain control factor may be determined according to another method, or whether to transmit the gain control factor may also be determined on the basis of other information of the gain control factor.

In an exemplary embodiment, an operation of a switch included in the BB analog circuit unit may be controlled by a switching control signal generated according to whether to transmit the gain control factor (S1306). For example, when the gain control factor is transmitted to the BB analog circuit unit, the switch may be switched to the position of $s_{12}$, and when the gain control factor is not transmitted to the BB analog circuit unit (that is, when the gain control factor expires in the BB digital circuit unit), the switch is switched to the position of $s_{11}$.

As described above, according to this disclosure, since BB analog SIC is effectively performed on the basis of the gain control factor determined by the BB digital circuit unit and a switching operation of the switch, a quantization error of a desired signal may be reduced. For example, in a case in which the SI signal is not great, compared with the desired signal, it may be determined that ADC bit resolution of the desired signal is high and only digital SIC may be performed. In contrast, when the SI signal is great, compared with the desired signal, it may be determined that ADC bit resolution of the desired signal is low and digital SIC and analog SIC may be performed. In this case, analog SIC may be simply performed by the AGC. Thus, by applying the gain control factor information processed in a digital area to the BB analog SIC, high efficiency may be obtained in terms of complexity, cost, and power consumption, compared with the configuration in which all of SIC of the IFD transmitting/receiving apparatus is performed as a signal processing operation of an analog area. Also, even though a very high quantization error occurs in the desired signal, data may be transmitted using a high-order modulation scheme, and as a result, link capacity as much as twice that of the HD scheme may be achieved.

Figure 14:
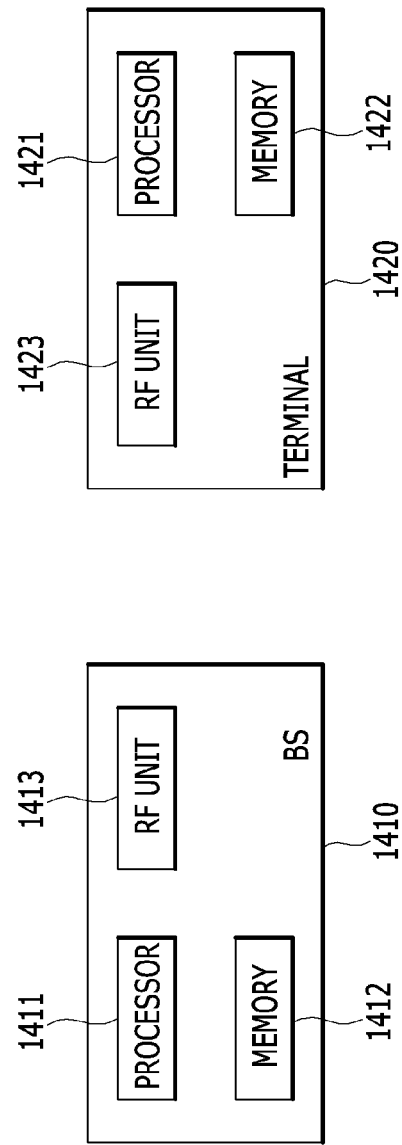
FIG. 14 is a block diagram illustrating a wireless communication system according to an exemplary embodiment.

FIG. 14 is a block diagram illustrating a wireless communication system according to an exemplary embodiment.

Referring to FIG. 14, a wireless communication system according to an exemplary embodiment includes a base station (BS) 1410 and a terminal 1420.

The BS 1410 includes a processor 1411, a memory 1412, and a radio frequency (RF) unit 1413. The memory 1412 may be connected to the processor 1411 and store various types of information for driving the processor 1411 or at least one program executed by the processor 1411. The RF unit 1413 may be connected to the processor 1411 and transmit and receive an RF signal. The processor 1411 may implement the functions, processes, or methods proposed in the exemplary embodiments of the present disclosure. Here, in the wireless communication system according to an exemplary embodiment of the present disclosure, a radio interface protocol layer may be implemented by the processor 1411. In an exemplary embodiment, an operation of the BS 1410 may be implemented by the processor 1411.

The terminal 1420 may include a processor 1421, a memory 1422, and an RF unit 1423. The memory 1422 may be connected to the processor 1421 and store various types of information for driving the processor 1421. The RF unit 1423 may be connected to the processor 1421 and transmit and receive an RF signal. The processor 1421 may implement the functions, processes, or methods proposed in the exemplary embodiments of the present disclosure. Here, in the wireless communication system according to an exemplary embodiment of the present disclosure, a radio interface protocol layer may be implemented by the processor 1421. In an exemplary embodiment, an operation of the terminal 1420 may be implemented by the processor 1421.

In an exemplary embodiment of the present disclosure, a memory may be positioned within or outside of a processor, and the memory may be connected to the processor through various known units. The memory may be a volatile or non-volatile storage medium in various forms. For example, the memory may include a read-only memory (ROM) or a random access memory (RAM).

The embodiments of the present invention have been described in detail, but the scope of the present invention is not limited thereto and various variants and modifications by a person skilled in the art using a basic concept of the present invention defined in claims also belong to the scope of the present invention.

What is claimed is:

1. An apparatus for transmitting/receiving a signal in inband full duplex system, the apparatus comprising:
a baseband (BB) analog circuit unit configured to reduce a quantization error in a BB analog area with respect to a reception signal by performing variable gain amplification on a self-interference (SI) signal based upon a gain control coefficient determined on the basis of a difference between strength levels of input and output signals of a BB digital circuit unit performing SI cancellation (SIC), the SI signal being provided for amplification after the SIC is performed in a digital area;
wherein the BB digital circuit unit is configured to perform the SIC in the digital area on a first output signal output from the BB analog circuit unit.

2. The apparatus of claim 1, further comprising: a radio frequency (RF) analog circuit unit configured to perform SIC in an RF analog area through a finite impulse response (FIR) filter.

3. The apparatus of claim 2, wherein: the BB analog circuit unit includes a first digital-to-analog converter (DAC) and a second DAC, and the first DAC converts a transmission signal into an analog signal and delivers the converted analog signal to the RF analog circuit unit, and the second DAC converts a self-interference (SI) signal output from the BB digital circuit unit into an analog signal and delivers the converted analog signal to the VGA.

4. The apparatus of claim 2, wherein: the BB analog circuit unit further includes: an automatic gain controller (AGC) configured to automatically control a gain of the reception signal; and a switch configured to perform switching between the RF analog circuit unit and the VGA and the AGC, and the BB digital circuit unit generates a switching control signal for controlling the switch.

5. The apparatus of claim 4, wherein: the BB digital circuit unit determines the switching control signal on the basis of a difference between the strength level of the input signal input to the BB digital circuit unit and the strength level of the output signal output from the BB digital circuit unit.

6. The apparatus of claim 5, wherein: the switch is switched toward the RF analog circuit unit by the switching control signal when the difference is smaller than a predetermined threshold value, and switched toward the VGA by the switching control signal when the difference is greater than the predetermined threshold value.

7. The apparatus of claim 2, wherein: the BB analog circuit unit includes a digital-to-analog converter (DAC), and the DAC converts a transmission signal into an analog signal, and delivers the converted analog signal to the VGA and the RF analog circuit unit.

8. The apparatus of claim 2, further comprising: one antenna configured to transmit and receive a signal, wherein the RF analog circuit unit includes a distributor distributing the reception signal and a transmission signal to be transmitted through the antenna.

9. The apparatus of claim 2, further comprising: one antenna configured to transmit and receive a signal, wherein the RF analog circuit unit includes a distributor distributing the reception signal and a transmission signal to be transmitted through the antenna.

10. A method for transmitting/receiving a signal in inband full duplex (IFD) system, the method comprising:
   reducing a quantization error in a baseband (BB) analog area with respect to a reception signal by performing, by a variable gain amplifier (VGA), variable gain amplification on a self-interference (SI) signal based on a gain control coefficient determined on the basis of a difference between strength levels of input and output signals of a BB digital circuit unit performing SI cancellation (SIC), the SI signal being provided for amplification after the SIC is performed in a digital area; and
   performing the SIC in the digital area on a first output signal output from a BB analog circuit unit.

11. The method of claim 10, further comprising: performing SIC in a radio frequency (RF) analog area through a finite impulse response (FIR) filter.

12. The method of claim 11, wherein: the reducing of the quantization error further includes:
   converting a transmission signal into an analog signal and delivering the converted analog signal to the FIR filter; and
   converting the SI signal into an analog signal and delivering the converted analog signal to the VGA.

13. The method of claim 11, wherein: the reducing of the quantization error further includes:
   automatically controlling, by an automatic gain controller (AGC), a gain of the reception signal; and
   performing switching between a first terminal to which the reception signal is delivered and a second terminal connected to the VGA, and the AGC, and the performing of the SIC includes: generating a switching control signal for controlling a switch.

14. The method of claim 13, further comprising: determining the switching control signal on the basis of a difference between the strength level of the input signal input to the BB digital circuit unit and the strength level of the output signal output from the BB digital circuit unit.

15. The method of claim 14, further comprising:
   switching the switch to the first terminal by the switching control signal when the difference is smaller than a predetermined threshold value; and
   switching the switch to the second terminal by the switching control signal when the difference is greater than the predetermined threshold value.

16. The method of claim 11, wherein: the reducing of the quantization error further includes: converting a transmission signal into an analog signal and delivering the converted analog signal to the VGA and the FIR filter.

17. The method of claim 11, further comprising: distributing the reception signal and a transmission signal to be transmitted through an antenna through which the reception signal has been received.

18. The method of claim 11, further comprising: receiving the reception signal by a reception antenna, and transmitting a transmission signal by a transmission antenna.

* * * * *